United States Patent
Oyama et al.

[11] Patent Number: 5,855,699
[45] Date of Patent: Jan. 5, 1999

[54] METHOD FOR MANUFACTURING WELDED CLAD STEEL TUBE

[75] Inventors: Motoaki Oyama; Minoru Yuzuki; Kazuto Terai, all of Tokyo; Yuko Takeuchi, Nagoya; Hitoshi Hayakawa, Tokai, all of Japan

[73] Assignees: Daido Tokushuko Kabushiki Kaisha, Nagoya; Nippon Kokan Co., Ltd., Tokyo, both of Japan

[21] Appl. No.: 827,862

[22] Filed: Apr. 9, 1997

Related U.S. Application Data

[63] Continuation of Ser. No. 538,359, Oct. 3, 1995, abandoned.

[30] Foreign Application Priority Data

Oct. 3, 1994 [JP] Japan .................................. 6-260976

[51] Int. Cl.⁶ .................................................. C21D 9/08
[52] U.S. Cl. ........................ 148/519; 148/521; 148/530; 148/534
[58] Field of Search .................................. 148/519, 520, 148/521, 528, 530, 534

[56] References Cited

U.S. PATENT DOCUMENTS

| 3,355,265 | 11/1967 | Hudson et al. | 148/534 |
| 3,795,971 | 3/1974 | Chivinsky | 148/534 |
| 4,464,209 | 8/1984 | Taira et al. | 148/521 |

FOREIGN PATENT DOCUMENTS

| 60-190526 | 9/1985 | Japan | 148/530 |

*Primary Examiner*—George Wyszomierski
*Attorney, Agent, or Firm*—Bacon & Thomas

[57] ABSTRACT

In a method of the present invention for manufacturing a welded clad steel tube, an alloy including a corrosion-resisting or heat-resisting alloy is overlaid on a raw steel tube to manufacture a cold steel tube. Then, a cold or warm working is subjected to the clad steel tube. The clad steel tube is subjected to a heat treatment at a temperature exceeding a recrystallization temperature of the alloy.

8 Claims, 2 Drawing Sheets

METHOD FOR MANUFACTURING WELDED CLAD STEEL TUBE

This application is a continuation of application Ser. No. 08/538,359, filed Oct. 3, 1995 now abandoned.

BACKGROUND OF THE INVENTION

1. Field of the Invention

The present invention relates to a method for manufacturing a elongated welded clad steel tube having excellent heat and corrosion resistances as well as good bending property.

2. Description of the Related Art

Waste heat obtained from burning inflammable industrial waste and municipal waste have recently come to be utilized in power generation for the effective use of energy. Heat transfer boiler tubes used in power generation are made of steels whose grades according to the Japanese Industrial Standards (JIS) are STB 340 and STBA 24. Since exhaust gas resulting from combustion brings about problems of corrosion by the molten salts contained in adhering ashes and/or highly corrosive gases such as chloride and sulfide gases, the steam temperature have to be reduced to 300° C. or less. Unfortunately, the maximum power generating efficiency of the conventional method is about 15%. In order to overcome this problem, attempts have been made to increase the power generating efficiency to 30% by raising the steam temperature to 500° C.

It has been proposed to use a Ni alloy, such as Alloy 625 (22% Cr-62% Ni-9% Mo), as a heat transfer tube for power generating boilers whose operating stem temperature is 500° C. or more. The heat and corrosion resistance of the Ni alloy is extremely greater than STB 340 and STBA 24. Further, the following methods have been also proposed. A method of coating a Ni alloy or the like having excellent heat and corrosion resistance to the outer periphery surface of a currently used steel tube by powder spraying. A method of overlapping a Ni alloy or the like having excellent heat and corrosion resistance on the outer periphery surface of a currently used steel tube by plasma powder overlapping.

However, the method in which a Ni alloy having excellent heat and corrosion resistance, e.g., Alloy 625, is used as a material of the heat transfer tube for power generating boilers addresses the problem that the Ni alloy is expensive. The method in which a Ni alloy having excellent heat and corrosion resistance is coated to the outer periphery surface of the currently used tube by powder spraying addresses problems, one of which is that corrosion resistance is impaired due to overlay thickness, weld strength, and microvoid.

Further, the method of overlapping a Ni alloy having excellent heat and corrosion resistance on the outer periphery surface of a steel tube by plasma powder overlapping addresses no problems with respect to overlay thickness, weld strength, and heat and corrosion resistance, however not only has a shortcoming in obtaining accurate thickness, but also requires a large-sized welding machine for manufacturing elongated tubes, which entails an enormous cost.

Still further, having large surface roughness as overlaid, the clad steel tube obtained by this method also imposes the problem of poor nondestructive inspection accuracy.

Still further, there has been provided no appropriate heat transfer tubes for black liquid recovering boilers used in the paper manufacturing industry which have excellent heat and corrosion resistance as well as bending property and which are also inexpensive.

SUMMARY OF THE INVENTION

It is an object of the present invention to provide a method for manufacturing an elongated welded clad steel tube manufactured without using a large-sized welding machine, which is excellent in heat and corrosion resistance, bending property, dimensional accuracy, and nondestructive inspection accuracy.

To achieve the above object, the invention is applied to a method of manufacturing a welded clad steel tube. The method involves the steps of: preparing a clad steel tube (composite tube) by overlapping a corrosion-resisting or heat-resisting alloy on a raw steel tube such as a carbon steel, alloy steel, stainless steel, or heat-resisting steel tube; cold working or warm working the clad steel tube by rolling or drawing thereafter; and further subjecting the thus processed clad steel tube to a heat treatment at a temperature exceeding a recrystallization temperature. As a result, an elongated clad steel boiler tube excellent in heat and corrosion resistance, bending property, and dimensional accuracy which is parallelled to a corrosion-resisting Ni alloy can be obtained, the outer layer surface of the tube being formed into a tube by hot working or by hot working and then cold finishing.

The aforementioned method will be described in more detail. The chemical composition of a Ni—Cr—Mo alloy is as follows.

BRIEF DESCRIPTION OF THE DRAWINGS

In the accompanying drawings.

DETAILED DESCRIPTION OF THE INVENTION

Figure 1A:
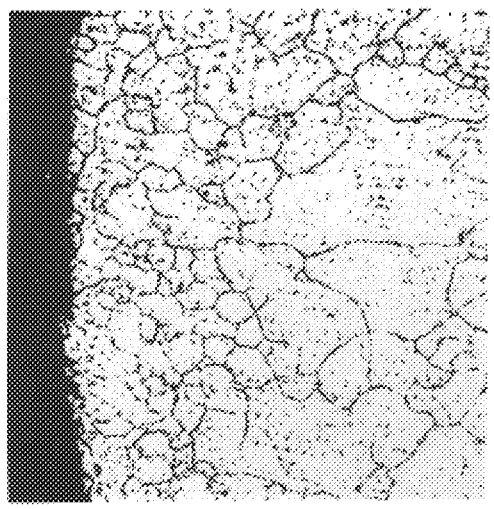
FIGS. 1A and 1B are microscopic photographs showing metallic structures of a clad steel tube manufactured by a method of the present invention.

The detailed description of the present invention will be described as follows.

In a method for manufacturing a welded clad steel boiler tube according to the present invention, a clad steel tube (composite tube) is prepared by overlapping a corrosion-resisting or heat-resisting alloy on an outer surface and/or an inner surface of a raw steel tube such as a carbon steel, alloy steel, stainless steel, or heat-resisting steel tube. Thereafter, the clad steel tube is subjected to a cold working or warm working by rolling or drawing, and further the thus processed clad steel tube is subjected to a heat treatment at a temperature exceeding a recrystallization temperature of the clad steel tube. As a result, the outer layer surface and/or the inner layer surface of the clad steel tube is formed to be excellent in heat and corrosion resistance, bending property and dimensional accuracy as similar to a corrosion-resisting Ni alloy which is manufactured by hot working or cold finishing after hot working.

In the present invention, it is preferable that the corrosion-resisting or heat-resisting alloy is Ni—Cr—Mo alloy. Further, preferable Ni—Cr—Mo alloy used in the present invention is as follows.

(1) An alloy containing C≦0.1 wt %, Si≦3.0 wt %, Mn≦3.0 wt %, Cr: 15.0 to 35.0 wt %, Mo: 1.0 to 20.0 wt % with both Cr and Mo amounting to 20.0 to 50.0 wt % and the rest being substantially all Ni, and preferably containing C≦0.05 wt %.

(2) An alloy containing one or more elements selected from the group consisting of W≦4.0 wt %, Nb≦4.0 wt %, Ta≦4.0 wt %, V≦4.0 wt %, Ti≦2.0 wt %, Zr≦1.0 wt %, Al≦1.0 wt %, Co ≦3.0 wt %, Cu≦2.0 wt %, B≦0.005 wt %, Mg≦0.1 wt %, Ca≦0.1 wt %, Y or a rare earth element≦0.1 wt %, and N≦0.1 wt %.

(3) Any of those alloys containing S≦0.02 wt %, P≦0.02 wt %, and O≦0.05 wt % to prevent weldability from being impaired.

Preferable raw steel tubes are described as follows while they are not limited such raw steel tubes.

In the case of carbon steel, steel grades STB 340, 410, and 510 in JIS G3461 for carbon steel boiler and heat exchanger tubes are preferred. In the case of alloy steel, steel grades STBA 12, 13, 20, 22, 23, 24, 25, and 26 in JIS G3462 for alloy steel boiler and heat exchanger tubes are preferred. In the case of stainless steel, steel grades SUS (304, 309, 310, 316, 317, 321, 347, XM15J1, 329JI, 329JL, 405, 409, 410, 410Ti, 430, 444) TB, SUS (304, 316, 321, 347) HTB, SUS (304, 316, 317) LTB in JIS G3463 for stainless steel boiler and heat exchanger tubes are preferred. In the case of heat-resisting steel, HCMV, F-1, AN15, AN31, 15-15N, 17-14CuMo, Esshete 1250, 18-8TiBn, and the like are preferred.

With respect to the built-up welding method, the plasma powder overlapping method or a hot wire tig welding method (HOT-TIG method) is preferred, although the overlapping method is not limited to these.

The following heat treatments have to be given to make crystals finer and to improve cold-bending property as well as heat and corrosion resistance. After cold working, warm working, or drawing, 1) the corrosion-resisting or heat-resisting alloy such as a Ni—Cr—Mo alloy, which is in the outer and/or inner periphery portion of the clad steel tube, is subjected to a solution heat treatment at 1100° C. or more for a predetermined period of time, so that such alloy portion is recrystallized; and 2) then, such heat treatments as to match the elements of the raw steel tube of the clad steel tube are given, so that such elements are recrystallized.

For example, predetermined heat treatments specified by JIS may be given to carbon steel and low alloy steel tubes.

Consequently, desirable recrystallized microstructure can be obtained for the raw steel tube and the outer and/or inner periphery portions of the clad steel tube.

In the present invention, the heat treatments are given after cold working or warm working such as rolling and drawing so as to elongate the clad steel tube, improve cold-bending property by recrystallizing, make crystals finer and give the clad steel tube a uniform thickness to improve dimensional accuracy. The reasons why cold working or warm working is effected instead of hot working in this embodiment are: (1) the base metal and the overlayed layer cannot be worked uniformly by hot working due to the fact that the heat resistance of the base metal is different from that of the overlayed layer; and (2) flaws are produced by hot working. Cold working and warm working are less susceptible to such defects. For these reasons, it is desirable to work the clad steel tube at 400° C. or less. Here, generally, the temperature range of the warm working is in the range of 300° C. to 500° C., and that of the cold working is less than 300° C.

Moreover, the plasma powder overlapping method is preferred as the overlapping method in the present invention. This is because the penetrating of the overlapping metal into the raw steel tube (base metal) occurs less in the plasma powder overlapping method; the plasma powder overlapping method allows two or more kinds of powder to be mixed so that a composite material can be obtained easily; and automatic welding can be effected using hardened alloys in the form of powder, the hardened alloys not being formable into wires or rods.

The hot wire tig welding method is preferred as the overlapping method in the present invention. This is because welds are of high quality owing to the fact that welding is effected in an inert gas atmosphere and that the arc is soft and stable; a less diluted, satisfactory raw tube (base metal) can be obtained if an appropriate way is taken to insert the filler rod; and high welding speed is ensured.

Examples of the present invention and comparative examples will be described as follows.

EXAMPLE 1

A clad steel tube having a diameter of 38.1 mm, a thickness of 6.6 mm (the thickness of Alloy C-276 is 1.5 mm), and a length of 6000 mm was obtained by following manner. Alloy C-276 (C:0.007%, Cr:15.0%, Ni:60.9%, Mo:15.5%) was overlayed on an outer periphery of a STB 340 raw steel tube whose diameter was 55.6 mm and whose thickness was 7.3 mm with an overlay of 22 mm by the plasma powder overlapping method. Then, the thus processed tube was cold-rolled with a reduction rate of 56%. The cold-rolled tube was subjected to a solution heat treatment at 1150° C. Thereafter, the thus treated tube was normalized at 910° C. The results were indicated as Sample No. 1 in Table 1.

It may be noted that the cold-bending test shown in Table 1 was carried out under a bending radius of 76 R, a bending angle of 180°, and at ambient temperature.

EXAMPLES 2 and 3

The clad steel tubes were obtained under the same conditions as in Example 1 except that Alloy 625 (0.01% C, 22% Cr, 62% Ni, 9% Mo, 3.6% Nb) (Example 2) and Alloy 825 (0.01% C, 21% Cr, 40% Ni, 3% Mo) (Example 3) were used as the overlayed alloys. The results are indicated as Samples Nos. 2 and 3 in Table 1.

EXAMPLE 4

Alloy C-276 was overlaid on a STBA 24 raw tube having the same dimensions as those of the tube of Example 1. The thus processed tube was similarly subjected to a solution heat treatment at 1150° C. after cold rolled, and then normalized at 930° C. and tempered at 740° C. The results are indicated as Sample No. 4 in Table 1.

EXAMPLE 5

Alloy C-276 was overlayed on a SUS 304 raw tube having the same dimensions as those of the tube of Example 1. The thus processed tube was similarly subjected to a solution heat treatment at 1150° C. after cold rolled. The results are indicated as Sample No. 5 in Table 1.

Comparative Example 1

This Comparative Example 1 was obtained under the same conditions as those of Example 1 except that the tube was subjected to a solution heat treatment at 1050° C. and then normalized at 910° C. The results are indicated as Sample No. 6 in Table 1. Since the outer layer, which is the Alloy C-276 portion, was not recrystallized sufficiently, the tube was not softened satisfactorily, which produced cracks. As a result, the cold-bending property was poor.

Comparative Examples 2 and 3

These Comparative Examples 2 and 3 were obtained under the same conditions as those of Examples 2 and 3 except that the tube was subjected to a solution heat treatment at 1050° C. and then normalized at 910° C. The results are indicated as Samples Nos. 7 and 8 in Table 1. Similarly to Comparative Example 1, the cold-bending property was poor.

Comparative Example 4

This Comparative Example 4 was obtained under the same conditions as those of Example 4 except that the tube was subjected to a solution heat treatment at 1050° C., normalized at 930° C., and then tempered at 740° C. The results are indicated as Sample No. 9 in Table 1. Similarly to Comparative Example 1, the cold-bending property was poor.

Comparative Example 5

This Comparative Example 5 was obtained under the same conditions as those of Example 5 except that the tube was subjected to a solution heat treatment at 1050° C. The results are indicated as Sample No. 10 in Table 1. Similarly to Comparative Example 1, the cold-bending property was poor.

Comparative Examples 6 to 9

Clad steel tubes, each having a length of 3000 mm, were obtained by overlapping Alloy C-276 and Alloy 825 on alloy steel and stainless steel raw tubes by plasma powder overlapping. A clad steel tube made of alloy steel, which is Comparative Example 7; was normalized at 930° C. and then tempered at 740° C. since the weld of such clad steel has been hardened after the overlapping. The other Comparative Examples were as overlaid. While all these Comparative Examples exhibited satisfactory cold-bending property, thickness accuracy is poor despite the fact that these clad steel tubes are short.

TABLE 1

| SAMPLE No. | MATERIAL OF RAW STEEL TUBE | MATERIAL OF OVERLAYING | COLD OR WARM ROLLING | LENGTH OF CLAD STEEL TUBE | HEAT PROCESS*) | THICKNESS ACCURACY OF CLAD STEEL TUBE | COLD BENDING PROPERTY |
|---|---|---|---|---|---|---|---|
| 1 | CARBON STEEL STB 340 | Alloy C-276 | yes | 6000 mm | 1) 1150° C. 2) 910° C. | +0.3 −0 | GOOD |
| 2 | CARBON STEEL STB 340 | Alloy 625 | yes | 6000 mm | 1) 1150° C. 2) 910° C. | +0.3 −0 | GOOD |
| 3 | CARBON STEEL STB 340 | Alloy 825 | yes | 6000 mm | 1) 1150° C. 2) 910° C. | +0.3 −0 | GOOD |
| 4 | ALLOY STEEL STBA 24 | Alloy C-276 | yes | 6000 mm | 1) 1150° C. 2) 930° C. 3) 740° C. | +0.3 −0 | GOOD |
| 5 | STAINLESS STEEL SUS 304 | Alloy C-276 | yes | 6000 mm | 1) 1150° C. | +0.3 −0 | GOOD |
| 6 | CARBON STEEL STB 340 | Alloy C-276 | yes | 6000 mm | 1) 1150° C. 2) 910° C. | +0.3 −0 | BAD |
| 7 | CARBON STEEL STB 340 | Alloy C-625 | yes | 6000 mm | 1) 1150° C. 2) 910° C. | +0.3 −0 | BAD |
| 8 | CARBON STEEL STB 340 | Alloy C-825 | yes | 6000 mm | 1) 1150° C. 2) 910° C. | +0.3 −0 | BAD |
| 9 | ALLOY STEEL STBA 24 | Alloy C-276 | yes | 6000 mm | 1) 1150° C. 2) 910° C. 3) 740° C. | +0.3 −0 | BAD |
| 10 | STAINLESS STEEL SUS 304 | Alloy C-276 | yes | 6000 mm | 1) 1150° C. | +0.3 −0 | BAD |
| 11 | CARBON STEEL STB 340 | Alloy C-276 | no | 3000 mm | — | +0.8 −0 | GOOD |
| 12 | ALLOY STEEL STBA 24 | Alloy C-276 | no | 3000 mm | 1) 1150° C. 2) 740° C. | +0.8 −0 | GOOD |
| 13 | STAINLESS STEEL SUS 304 | Alloy C-276 | no | 3000 mm | — | +0.8 −0 | GOOD |
| 14 | STAINLESS STEEL SUS 304 | Alloy 825 | no | 3000 mm | — | +0.8 −0 | GOOD |

*): 1) SOLUTION HEAT TREATMENT
2) NORMALIZING
3) TEMPERING

Figure 1B:
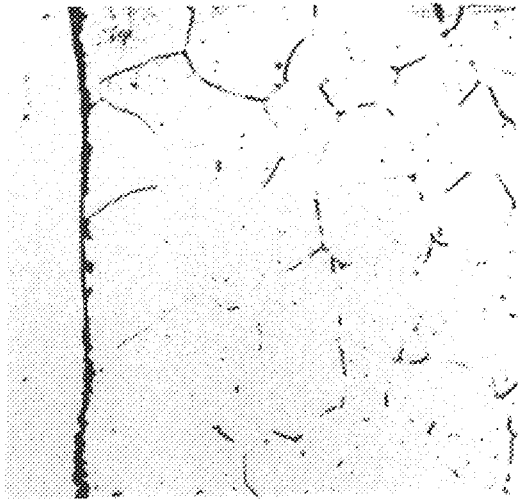

FIGS. 1A and 1B are microscopic photographs showing Sample No. 1 clad tube at a magnification of 400 times. FIG. 1A shows a corrosion-resisting alloy portion in the outer layer, and FIG. 1B shows a carbon steel portion in the inner layer.

Figure 2A:
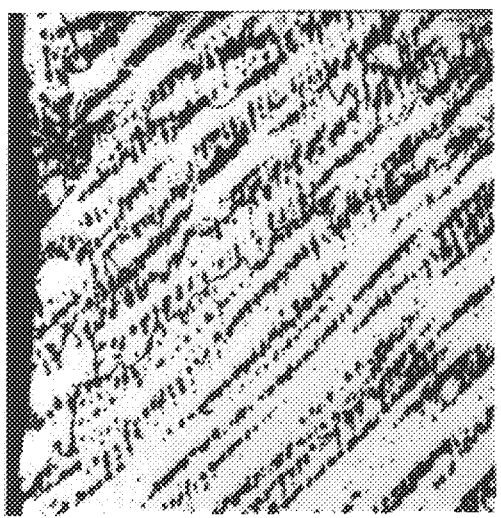
FIGS. 2A and 2B are microscopic photographs showing metallic structures of a clad steel tube manufactured by a method according to a comparative example.
Figure 2B:
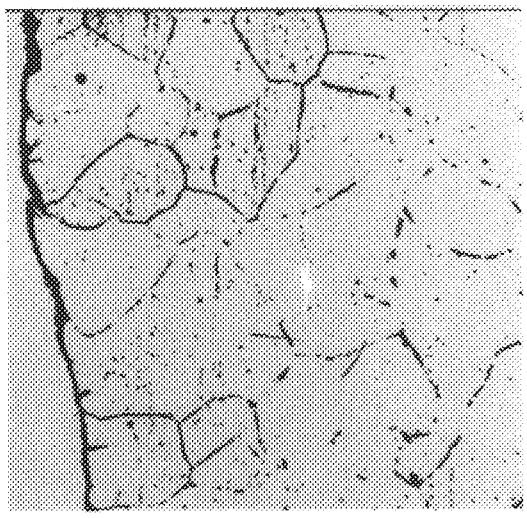

FIGS. 2A and 2B are microscopic photographs showing Sample No. 6 clad steel tube at a magnification of 400 times.

FIG. 2A shows a corrosion-resisting alloy portion in the outer layer, and FIG. 2B shows a carbon steel portion in the inner layer.

The microscopic structure of Sample No. 1 in FIGS. 1A and 1B is a microstructure in which both the corrosion-resisting alloy portion in the outer layer and the carbon steel portion in the inner layer are recrystallized by the solution heat treatment at 1150° C. and the normalization at 910° C.

The microscopic structure of sample No. 6 in FIGS. 2A and 2B is a microstructure in which the carbon steel portion in the inner layer is recrystallized by the normalization at 910° C. On the other hand, the corrosion-resisting alloy portion in the outer layer was not sufficiently recrystallized by the solution heat treatment at 1050° C. That is, the corrosion-resisting alloy portion in the outer layer became a hardened structure by welding and cold rolling.

Figure 3A:
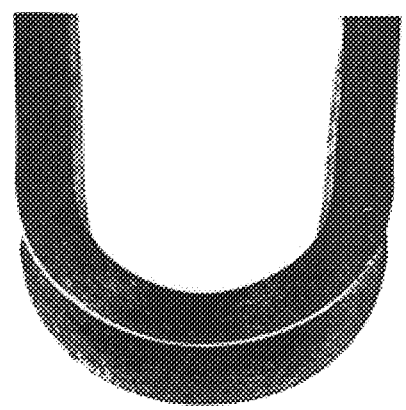
FIGS. 3A and 3B are photographs taken after Sample No. 1 and 6 clad steel tube was subjected to a cold-bending test, respectively.

FIG. 3A is a photograph taken after Sample No. 1 clad steel tube was subjected to a cold-bending test. Satisfactory bending property is exhibited.

Figure 3B:
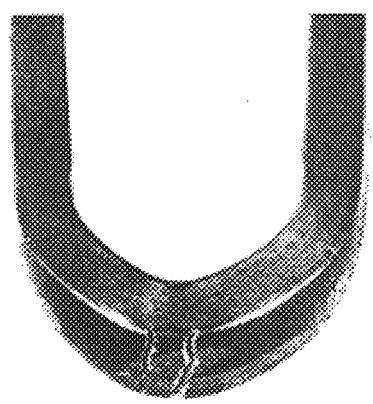

FIG. 3B is a photograph taken after Sample No. 6 clad steel tube was subjected to a cold-bending test. Cracks are present in the corrosion-resisting alloy portion in the outer layer.

The present invention is not limited to the aforementioned embodiments, but may be embodied in various other modes within the scope of the present invention.

In the present invention, a clad steel tube is manufactured by overlapping a corrosion-resisting or heat-resisting alloy on a raw steel tube, then cold rolling or warm rolling the clad steel tube, and further subjecting the clad steel tube to heat treatments. Therefore, the clad steel tube of the present invention has the following advantages.

(1) A long clad steel tube having excellent heat and corrosion resistance as well as bending property can be manufactured inexpensively.

(2) A long clad steel tube can be manufactured without using a large-scale welding machine.

(3) A clad steel tube of the present invention has improved dimensional accuracy and surface roughness compared with hot-worked steel tubes, which in turn allows the clad steel tube of the invention to be subjected to high-precision nondestructive inspection.

What is claimed is:

1. A method for manufacturing a welded clad steel tube comprising the steps of:
    cladding by welding an alloy including at least one of a corrosion-resisting and heat-resisting alloy on a raw steel tube to manufacture a clad steel tube;
    subjecting said clad steel tube to at least one of cold and warm working to said clad steel tube; and
    recrystallizing said alloy of said clad steel tube by subjecting said alloy to recrystallization conditions for said alloy which includes heat treating at a temperature of 1,100° C.–1,150° C. whereby said temperature exceeds the recrystallization temperature of said alloy.

2. A method for manufacturing a welded clad steel tube according to claim 1, wherein said alloy is a Ni—Cr—Mo alloy.

3. A method for manufacturing a welded clad steel tube according to claim 2, wherein said alloy includes Ni, C$\leq$0.1 wt %, Si$\leq$3.0 wt %, Mn$\leq$3.0 wt %, Cr: 15.0 to 35.0 wt %, Mo: 1.0 to 20.0 wt % with both Cr and Mo amounting to 20.0 to 50.0 wt %.

4. A method for manufacturing a welded clad steel tube according to claim 3, wherein said alloy includes C$\leq$0.05 wt %.

5. A method for manufacturing a welded clad steel tube according to claim 3, wherein said alloy includes at least one element selected from the group consisting of W$\leq$4.0 wt %, Nb$\leq$4.0 wt %, Ta$\leq$4.0 wt %, V$\leq$4.0 wt %, Ti$\leq$2.0 wt %, Zr$\leq$1.0 wt %, Al$\leq$1.0 wt %, Co$\leq$3.0 wt %, Cu$\leq$2.0 wt %, B$\leq$0.005 wt %, Mg$\leq$0.1 wt %, Ca$\leq$0.1 wt %, Y or a rare earth element$\leq$0.1 wt %, and N$\leq$0.1 wt %.

6. A method for manufacturing a welded clad steel tube according to claim 5, wherein said alloy includes S$\leq$0.02 wt %, P$\leq$0.02 wt %, and O$\leq$0.05 wt %.

7. A method for manufacturing a welded clad steel tube according to claim 1, wherein said at least one of cold and warm working is performed at a temperature less than 400° C.

8. A method for manufacturing a welded clad steel tube according to claim 1, which further comprises recrystallizing said raw steel of said clad steel tube by subjecting said raw steel to recrystallization conditions for said raw steel which includes heat treating at a temperature which exceeds the recrystallization temperature of said raw steel.

* * * * *